United States Patent [19]

Moore

[11] Patent Number: 4,591,632

[45] Date of Patent: May 27, 1986

[54] FREEZE COAGULATION PROCESS

[76] Inventor: Eugene R. Moore, 5600 Woodview, Midland, Mich. 48640

[21] Appl. No.: 713,671

[22] Filed: Mar. 19, 1985

[51] Int. Cl.$^4$ ............................................. C08C 1/14
[52] U.S. Cl. ............................................. 528/481
[58] Field of Search ...................................... 528/481

[56] References Cited

U.S. PATENT DOCUMENTS

| | | |
|---|---|---|
| 2,396,907 | 3/1946 | Wolk et al. |
| 3,032,524 | 5/1962 | Brewer |
| 3,311,601 | 3/1967 | Conley ............................. 528/481 |
| 3,607,807 | 9/1971 | Huddleston ....................... 528/481 |

FOREIGN PATENT DOCUMENTS 3230128  2/1984  Fed. Rep. of Germany.
47-39233 12/1972  Japan.

OTHER PUBLICATIONS

"Sandvik SteelBelt Freezing System" Literature.
"Turbo Ice Systems" Literature.
"Vogt Tube-Ice Machines" Literature.

*Primary Examiner*—Paul R. Michl
*Attorney, Agent, or Firm*—Price, Heneveld, Huizenga & Cooper

[57] ABSTRACT

The specification discloses a method for freeze coagulating polymeric material in which the freezing surface is coated with a thin film of ice to facilitate separation of the coagulated material from the freezing surface without the need for mechanical scraping.

11 Claims, 4 Drawing Figures

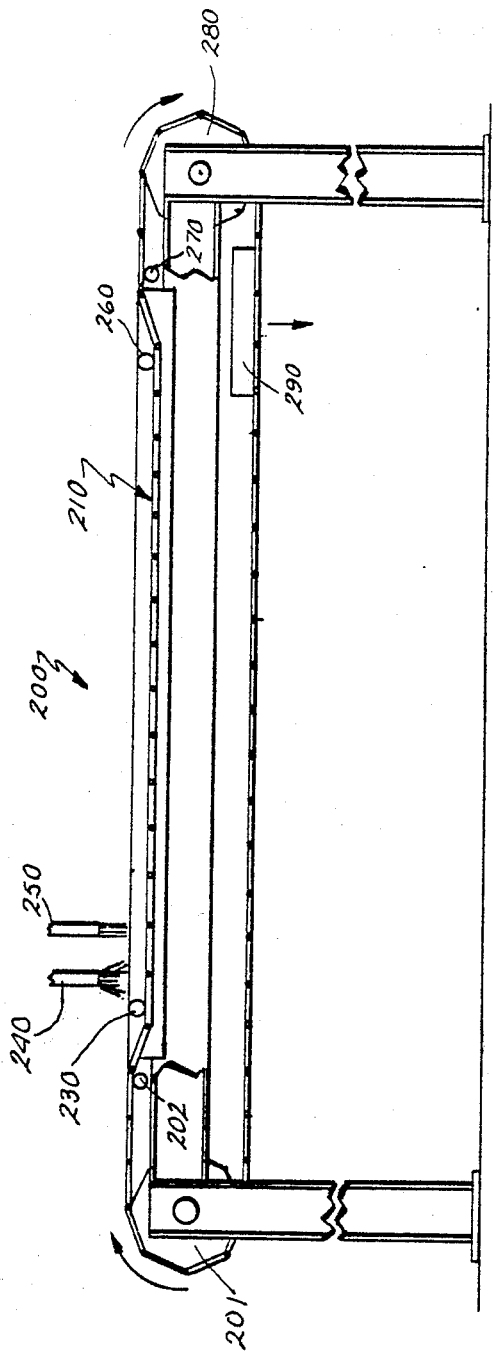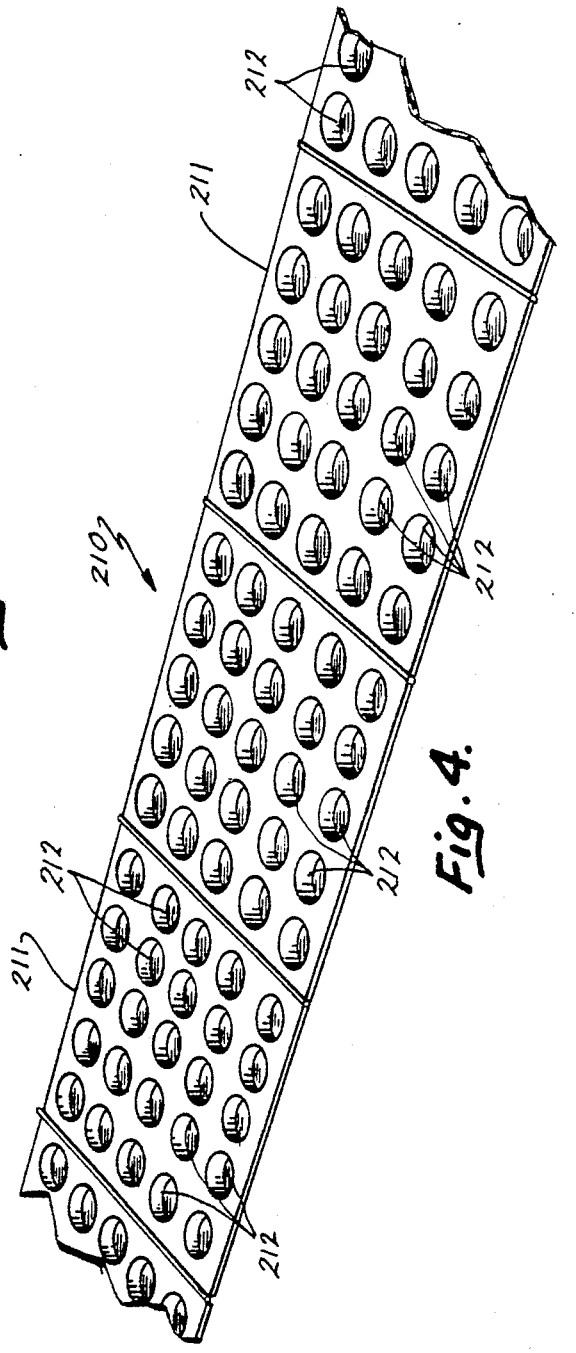

FREEZE COAGULATION PROCESS

BACKGROUND OF THE INVENTION

The present invention relates to the coagulation of latex, as the term is broadly defined. Broadly, a latex is an emulsion of polymeric materials. Such emulsions are often formed in a polymerization process known as emulsion polymerization. Once formed in the emulsion, the smaller particles must be coagulated into larger particles and separated from the surfactant in water solution which carries the emulsion.

The two most commonly used commercial coagulation processes are shear and chemical coagulation. Shear coagulation involves mechanical agitation of the emulsion. While coagulation is effective, the water remaining after coagulation is completed is opaque and cloudy. It presents a serious disposal problem. It cannot readily be reused due to the emulsified polymer remaining.

Chemical coagulation is also effective. The residual water is clear. However, it is contaminated with the coagulating chemicals and also presents a disposal problem. The contaminating chemicals prevent one from reusing the surfactant solution in subsequent emulsification.

Freeze coagulation in an embodiment which simulates commercial ice making equipment has been used on a small scale. It involves immersing a chilled freezing surface into the emulsion to freeze the emulsion, thereby causing the polymer to coagulate. After thawing, the polymer is coagulated and the residual surfactant water solution is crystal clear and free of chemical contaminants. Hence it can be readily reused in further emulsification polymerization.

However, the polymer, especially if it constitutes or includes an elastomeric component and is high enough in solids to be of commercial interest (higher than 20% solids, but preferably above 30% solids and most preferably above about 35% solids), has a tendency to adhere to the freezing surface. It has to be scraped off of the freezing surface. German Pat. No. 32 30 128 discloses a scraping mechanism for scraping the coagulated polymer from the freezing surface used in a freeze coagulation process.

Others have tried to obviate this difficulty by eliminating the freezing surface. In such an approach, the emulsion is introduced directly into a refrigerant such as freon. The frozen, coagulated mass is then thawed and the clear water separated from the coagulated product. The drawbacks to this method include the expense of the refrigerant material as well as dealing with the vapors thereof, and difficulty in removing traces of the refrigerant from the product.

These drawbacks have relegated freeze coagulation to a "back seat" vis-a-vis other coagulation techniques.

SUMMARY OF THE INVENTION

In the present invention, the problem of coagulated polymeric products adhering to the freezing surface is eliminated by first coating the freezing surface with a thin film of ice. The latex is then exposed to the ice coated freezing surface and polymeric material is allowed to coagulate on the coated, freezing surface. The coagulated product can readily be removed from the freezing surface, most preferably by warming the freezing surface to cause the ice layer to melt and thereby allowing the coagulated product to fall away from the freezing surface.

These and other objects and advantages of the invention will be more fully understood and appreciated by reference to the drawings and the detailed description of the preferred embodiment set forth hereinbelow.

BRIEF DESCRIPTION OF THE DRAWINGS

FIG. 3 shows a third alternative embodiment freeze coagulation apparatus; and

FIG. 4 is an enlarged view of a segment of the belt used in the FIG. 3 apparatus.

DESCRIPTION OF THE PREFERRED EMBODIMENT

Figure 1:
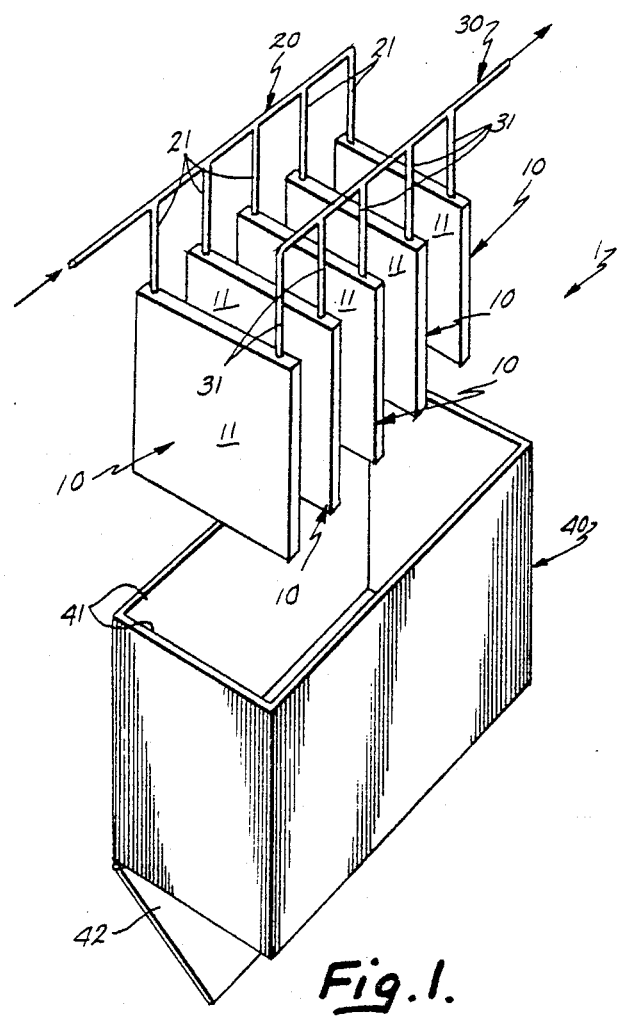
FIG. 1 illustrates a first alternative embodiment freeze coagulation apparatus.

A variety of different types of equipment can be used to practice the present invention. In freeze apparatus 1 (FIG. 1), the freezing surface is defined by a plurality of hollow plates 10 having a refrigerant circulating therethrough. The refrigerant is fed in through feed manifold 20 having a plurality of individual pipes 21 which feed each individual plate 10. The refrigerant exits through exit manifold 30 which includes individual pipes 31 extending from each plate 10. Interior coils or passageways are preferably provided to allow the circulation of refrigerant through the plates 10. The facing surfaces 11 on each side of each plate 10 are preferably configured to increase the surface area and efficiency of the plates and to give them strength. The material of which plates 10 is made is preferably kept thin so as to minimize resistance to heat transfer. Freezing apparatus 1 is comparable to one used on one type of commercially available ice making machine. One company from which such plate freezing equipment is available is Turbo Refrigerating Company of Denton, Tex. However, this equipment cannot be used "as sold" in the present invention, but must be modified as described below. Basically, a latex tank with a hinged bottom door must be incorporated in the apparatus.

The latex emulsion is maintained in a freeze tank 40 into which plates 10 can be dipped and removed. Tank 40 preferably includes an open top 41 and a hinged bottom plate 42 which can be opened to allow frozen, coagulated polymeric material to fall from tank 40 by gravity.

In operation, refrigerant is passed through plates 10 until they become chilled. Means are provided for alternatively contacting the plates first with water, then with the latex to be coagulated. A thin layer of water is then frozen on the plate surfaces 11 either by spraying plates 10 with water or alternatively by dipping them very briefly into a tank of water. Tank 40 can first be filled with water, or alternatively a separate water tank may be provided and plates 10 shuttled between the water tank and the emulsion tank 40 by means of an overhead shuttle.

The ice film should be just sufficiently thick to cover the entire freezing surface. The ice layer should not be allowed to get any thicker than necessary, since it wastes energy and will tend to insulate the freezing surface and decrease its efficiency in coagulating the latex based product. While it is most preferable to use pure water, we have found that in many cases a dilute emulsion may be used containing up to about 10% solids, that in most cases up to about 5% emulsion solids may be present and in almost all cases about 1% of emulsion solids may be present, and have minimum or no sticking. Often a waste stream of low solids latex "white water" is generated during the latex production process. The use of such to precoat the freezing surface, both increases process yield, and solves a waste disposal problem.

Once coated with a thin layer of ice, freezing plates 10 are submerged into the latex emulsion in tank 40. They are left in the emulsion until the polymer layer on the freezing surface has become so thick that the rate of additional coagulation begins to slow down.

At that point, any liquid remaining in tank 40 is pumped out. Preferably, the spacing between plates 10 and the walls of tank 40 is such that liquid removal is minimal, i.e., the latex in tank 40 is substantially frozen.

The flow of refrigerant through plates 10 is stopped. Preferably, hot refrigerant, or a hot water solution or equivalent is circulated through plates 10 to accelerate melting of the ice layer on the freezing surfaces. The frozen mixture of emulsion carrier and coagulated polymer falls away from the freezing plate as the ice layer melts. Trap door 42 is opened so the frozen mixture falls out of tank 40 and into a container or device in which it is allowed to thaw.

The coagulant is then dewatered in a conventional manner. This can be done by mechanically pressing the coagulant in a filtering mechanism so as to force the water associated with the coagulant through the filter medium. A centrifuge may also be used.

Any water separated during mechanical pressing or centrifuging is preferably, and generally crystal clear and is free of chemical coagulants. The water does still contain a portion of any surfactant used to create the emulsion initially. However, this surfactant solution can readily be recycled and used to create further emulsions.

Figure 2:
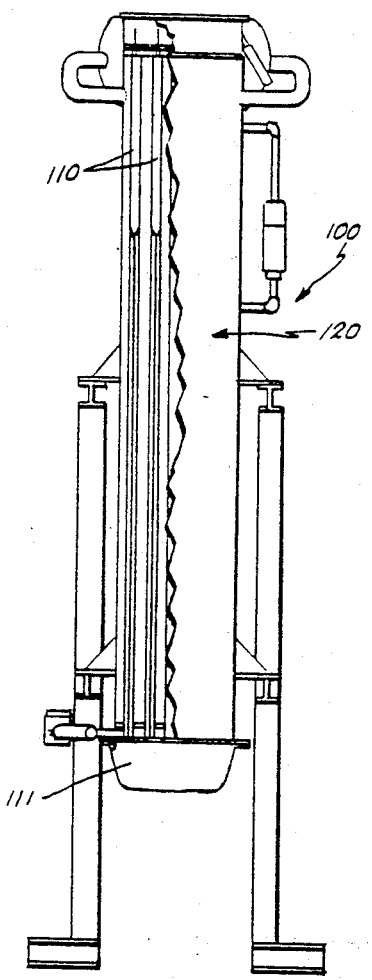
FIG. 2 shows a second alternative embodiment freeze coagulation apparatus.

Alternative embodiment freezing equipment 100 (FIG. 2) also involves a modification of a commercially available ice manufacturing machine of the type referred to as a vertical tube bundle device. Such basic equipment is available, for example, from Henry Vogt Machine Company of Louisville, Ky.

Freezer 100 comprises basically a plurality of hollow freezer tubes 110 positioned within a jacket or tank 120. Refrigerant is circulated within jacket 120 around freezer pipes 110. The actual freezing surface comprises the interior of freezing pipes 110. Freezer 100 includes a hinged bottom door 111 which closes the bottoms of tubes 110.

As used in the present invention, freezer tubes 110 are first coated with ice. This may be accomplished if the tubes are sprayed with water or filled with water, with bottom door 111 closed in order to freeze a thin layer of ice on the interior freezing surfaces of tubes 110. In the latter case, the water is then pumped out or allowed to drain out by opening bottom 111. Freezer pipes 110 are then refilled with latex which is allowed to freeze until such time as the polymer layer on the freezing surface of each tube 110 has become so thick that the rate of additional coagulation begins to slow down. Preferably, the apparatus is designed such that substantially all of the latex within a tube 110 will have been frozen as a result of such freezing.

If complete freezing has not been achieved, the liquid latex residue must first be pumped out or drained from tubes 110, then a short time allowed to freeze the remaining latex film. Then, heat is applied outside the tubes to melt the thin ice layer. Bottom door 111 is opened and the long rods or hollow cylinders of coagulated polymer are allowed to fall into a receiver for thawing. Then it is de-watered in a mechanical water press or centrifuge. Water is then separated from the polymer by pressing or centrifuging. Where desired, evaporation may be used to remove final traces of water.

When using either freezing apparatus 1 (FIG. 1) or freezing apparatus 100 (FIG. 2), the coagulated polymer would not normally be completely thawed at the time it is allowed to fall out of the apparatus. Thus, it would have to be allowed to thaw somewhat before water could be separated from the polymer by pressing or centrifuging. Some type of thawing receptacle would be employed between the de-watering press or centrifuge.

In order to avoid the necessity of such an intermediate thawing operation or apparatus, one might employ two freezing units. One would freeze while the other is thawing. In this way, substantial thawing may take place before the frozen latex is removed from the freezing apparatus. No thawing receiver would be necessary, and the thawed, coagulated latex could be dropped or conveyed directly into the de-watering apparatus. With such an arrangement, one would also not have to worry about hurrying to empty the freezing apparatus, and could gain thermal efficiency by allowing hot refrigerant from one freezing system to be cooled by the thawing latex.

The third alternative freezing apparatus 200 (FIG. 3) is like the continuous belt-type which is also commercially available for conventional ice freezing. One such system is a modification of the type of equipment available from Sandvik Conveyor, Inc. of Fair Lawn, N.J. The freezing surface is defined by a segmented steel belt 210 (FIG. 4). Belt 210 is divided into hingedly connected tray segments 211, each having a plurality of individual cube defining recesses 212.

In apparatus 200, belt 210 is carried over an end roller 201 and over a second roller 202 located ahead of and at one end of a freezing bath 220 (FIG. 3). Bath 220 is comprised of refrigerated brine, glycol or the like. Submersion roller 230 deflects belt 210 downwardly slightly at the beginning of freezing bath 220 so that only the bottom of each belt segment 211 actually contacts the refrigerant in freezing bath 220.

The freezing surface (top surface) of each segment 211 is then first sprayed with water at water spray nozzle 240. As belt 210 moves across freezing bath 220, a fine film of ice is formed between water spray station 240 and latex fill station 250. The depressions 212 in each segment 211 are then filled with latex at latex fill station 250. The latex freezes between latex fill station 250 and the end submersion roller 260. End submersion roller 260 is located at the end of freezing bath 220, and a lifting roller 270 just beyond the end of freezing bath 220 lifts belt 210 up out of freezing bath 220.

Belt 210 is conveyed around end roller 280 past a steam station 290 which faces the inside surface of belt 210 on its bottom course. The heat applied at steam station 290 thaws the ice layer between the freezing surface 211 and the frozen latex and causes the frozen latex to fall into a receiving station. It is then allowed to thaw and is dewatered in the manner described above.

In the practice of the present invention, one must insure that the latex emulsion is sufficiently near the freezing point prior to exposure to the freezing surface that the thin layer of ice on the freezing surface is not melted by such exposure. This problem is probably most acute in using the third alternative embodiment apparatus 200. The relatively short distance between water spray station 240 and latex fill station 250, combined with the difficulty of maintaining a brine solution at temperatures as low as those which can be maintained in other types of refrigerants which could not be used in an open system such as that of apparatus 200 makes it more difficult to keep the ice layer on the freezing surface of belt segments 211 frozen as latex is filled onto the freezing surface. Thus it is preferable that the latex be chilled in a heat exchanger to near its freezing point prior to its application to belt 210 at latex fill station 250.

A. Experimental Results

The invention was demonstrated by comparison to a conventional freeze coagulation approach on a laboratory basis. In both the control and preferred embodiment approaches, a freezing surface was provided by filling a 125 milliliter stainless beaker with a mixture of dry ice and methylene chloride.

In the control, the cooled beaker was dipped directly into a latex emulsion to a depth of about two inches for approximately seven minutes. During this time, a layer of frozen latex about one-quarter inch thick was formed on the beaker surface. The beaker was removed from the emulsion, the dry ice mixture was removed from the beaker and replaced with hot water. After about one-half hour, the frozen latex, or more specifically the carrier component thereof, had melted. However, the coagulated latex was very difficult to remove from the outside of the beaker. It was finally removed in part by scraping. A thin film of residue was then removed with steel wool.

In the preferred embodiment test, the same 125 milliliter stainless beaker filled with a mixture of dry ice and methylene chloride was first submerged for a few seconds in water to freeze a thin layer of ice on the surface of the beaker. The beaker was then immediately placed in the same latex emulsion as was used in the control for about seven minutes. As in the control, a layer of frozen latex approximately one-quarter inch thick was formed on the beaker, over the ice layer. The beaker was removed and the mixture of dry ice and methylene chloride was replaced with hot water as in the control. The difference was that in this case, the frozen latex, shaped like a cup, dropped from the beaker (under gravitational forces only) in less than 20 seconds. The coagulum was allowed to thaw and the water removed by conventional de-watering, and air drying.

It is of course understood that the above is merely a preferred embodiment of the invention and that various changes and alterations can be made without departing from the spirit and broader aspects thereof.

The embodiments of the invention in which an exclusive property or privilege is claimed are defined as follows:

1. A method for freeze coagulation of polymer emulsion comprising:
   providing a freezing surface for initiating freeze coagulation of the polymeric material;
   coating said freezing surface with a thin film of ice;
   exposing a polymer emulsion to said coated, freezing surface;
   allowing polymeric material to coagulate on said coated, freezing surface;
   separating said ice layer from said freezing surface to thereby separate said coagulated polymeric material from said freezing surface.

2. The method of claim 1 wherein said step of separating said ice layer from said freezing surface is accomplished by increasing the temperature of said freezing surface until said layer of ice melts, thereby allowing said coagulated polymeric material to fall away from said freezing surface.

3. The method of claim 2 in which said step of coating said freezing surface with said thin film of ice is conducted for just sufficient time to cause said entire freezing surface to be coated with said thin film of ice.

4. The method of claim 3 in which said step of allowing a layer of polymeric material to coagulate on said coated, freezing surface is conducted until such time as the rate of build up of said coagulating layer begins to diminish, thereby indicating that the coagulated layer has become an insulating layer between said freezing surface and further polymeric material.

5. The method of claim 4 in which the emulsifier solution is separated from said coagulated material and is recycled and used in further emulsion polymerization.

6. The method of claim 3 in which the emulsifier solution is separated from said coagulated material and is recycled and used in further emulsion polymerization.

7. The method of claim 2 in which the emulsifier solution is separated from said coagulated material and is recycled and used in further emulsion polymerization.

8. The method of claim 1 in which the emulsifier solution is separated from said coagulated material and is recycled and used in further emulsion polymerization.

9. The method of claim 2 in which said step of allowing a layer of polymeric material to coagulate on said coated, freezing surface is conducted until such time as the rate of build up of said coagulating layer begins to diminish, thereby indicating that the coagulated layer has become an insulating layer between said freezing surface and further polymeric material.

10. The method of claim 1 in which said step of allowing a layer of polymeric material to coagulate on said coated, freezing surface is conducted until such time as the rate of build up of said coagulating layer begins to diminish, thereby indicating that the coagulated layer has become an insulating layer between said freezing surface and further polymeric material.

11. The method of claim 1 in which said step of coating said freezing surface with said thin film of ice is conducted for just sufficient time to cause said entire freezing surface to be coated with said thin film of ice.

* * * * *